(12) United States Patent
Dovat et al.

(10) Patent No.: US 10,159,376 B2
(45) Date of Patent: Dec. 25, 2018

(54) AUTOMATED FLUID INJECTION HEAD OF BEVERAGE PREPARATION DEVICE

(71) Applicant: Nestec S. A., Vevey (CH)

(72) Inventors: Ludovic Dovat, Fehraltorf (CH); Christof Niedermann, Tägerschen (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 15/547,640

(22) PCT Filed: Feb. 22, 2016

(86) PCT No.: PCT/EP2016/053638
§ 371 (c)(1),
(2) Date: Jul. 31, 2017

(87) PCT Pub. No.: WO2016/142157
PCT Pub. Date: Sep. 15, 2016

(65) Prior Publication Data
US 2018/0263407 A1    Sep. 20, 2018

(30) Foreign Application Priority Data

Mar. 9, 2015 (EP) .................................. 15158130

(51) Int. Cl.
*A47J 31/36* (2006.01)
*A47J 31/40* (2006.01)
*B65D 85/804* (2006.01)

(52) U.S. Cl.
CPC ......... *A47J 31/407* (2013.01); *A47J 31/3695* (2013.01); *B65D 85/8043* (2013.01)

(58) Field of Classification Search
CPC .. A47J 31/407; A47J 31/3695; A47J 31/0663; A47J 31/3685; A47J 31/4467
(Continued)

(56) References Cited

U.S. PATENT DOCUMENTS

2006/0283331 A1* 12/2006 Lin ..................... A47J 31/0663
99/279

FOREIGN PATENT DOCUMENTS

KR      101433602 B1    8/2014
WO      2010081762 A1   7/2010
(Continued)

OTHER PUBLICATIONS

International Search Report, dated May 4, 2016, in PCT/EP2013/053638, filed Feb. 22, 2016.
(Continued)

*Primary Examiner* — Phuong Nguyen
(74) *Attorney, Agent, or Firm* — Dunlap Codding, P.C.

(57) ABSTRACT

The invention relates to a head assembly for a beverage preparation device for preparing a nutritional composition upon interaction of ingredients provided in a capsule with liquid supplied to the capsule, the assembly comprising capsule opening means (10) which are adapted to interact with an injection face of the capsule, the opening means comprising a liquid injection means (1) for injection of liquid into the capsule and a gas injection means (2) for injecting of gas into the capsule, activation means (20) designed for interacting with the opening means and for moving the liquid injection means and the gas injection means with respect to the injection face of the capsule. The head assembly also comprises a drive unit (70) for driving the activation means (20) and the activation means comprises a driving gear (20*b*) adapted to be driven in rotational movement by the drive unit (70) for sequentially moving the liquid injection means (1) and gas injection means (2).

15 Claims, 11 Drawing Sheets

Figure 1:
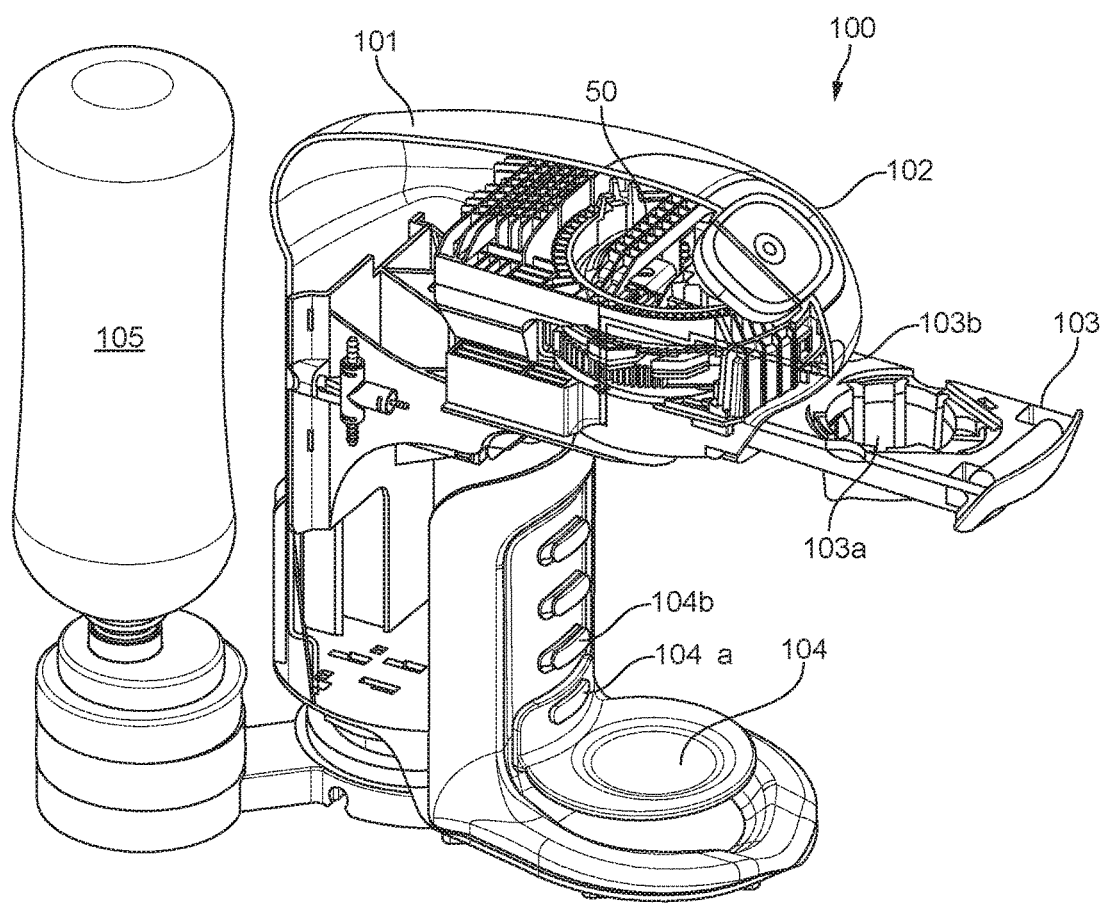

(58) Field of Classification Search
USPC .......................... 99/295–323, 279, 284, 495
See application file for complete search history.

(56) References Cited

FOREIGN PATENT DOCUMENTS

| | | |
|---|---|---|
| WO | 2010128028 A1 | 11/2010 |
| WO | WO2010128028 * | 11/2010 |
| WO | 2013127694 A1 | 9/2013 |
| WO | 2014082940 A1 | 6/2014 |

OTHER PUBLICATIONS

Written Opinion of the International Searching Authority, dated May 4, 2016, in PCT/EP2013/053638, filed Feb. 22, 2016.

* cited by examiner

AUTOMATED FLUID INJECTION HEAD OF BEVERAGE PREPARATION DEVICE

CROSS-REFERENCE TO RELATED APPLICATIONS/INCORPORATION BY REFERENCE STATEMENT

This application is a US national stage application filed under 35 USC § 371 of International Application No. PCT/EP2016/053638, filed Feb. 22, 2016; which claims priority to EP App No. 15158130.3, filed Mar. 9, 2015. The entire contents of the above-referenced patent applications are hereby expressly incorporated herein by reference.

TECHNICAL FIELD

The presently disclosed and/or claimed inventive concept (s) relates to a beverage preparation device for hygienically preparing a nutritional product such as e.g. an infant formula by interacting ingredients provided within a capsule with a liquid supplied thereto. In particular, the presently disclosed and/or claimed inventive concept(s) relates to a beverage preparation device with an improved fluid injection head comprising a water needle for injecting water into a capsule and an air needle for supplying air into the capsule, wherein both the water needle and the air needle are operated with an improved actuation means.

BACKGROUND

Capsule-based beverage preparation devices that enable the safe and convenient preparation of a ready-to-drink nutritional composition are already available on the market nowadays. A common principle of these devices is the utilization of capsules or cartridges that comprise a single-dose of nutritional ingredients for preparing the desired composition. After placing the capsule into a receiving chamber of the brewing head of the device and enclosing it therein, filtered respectively sanitized liquid such as water is injected into the capsule in order to interact, e.g. by means of dissolution and/or extraction, with the ingredients of the capsule. The resulting beverage is then drained from the capsule into a dedicated receiving receptacle placed below the brewing head of the device. The nutritional composition prepared by such beverage preparation device may be for example an infant formula, a nutritional liquid for toddlers, invalids, elderly people, persons having nutritional deficiencies or athletes. The term "nutritional composition" in the present context of the presently disclosed and/or claimed inventive concept(s) may further extend to standard "beverages" such as coffee, tea, milk-based drinks and the like.

EP 2 082 670 discloses a beverage preparation device adapted for receiving a capsule containing nutritional ingredients and to supply water thereto in order to reconstitute the nutritional composition, wherein the device comprises filtering means for treating the water in order to remove pathogens. Further, the device comprises purging means to empty the cartridge from residual liquid, for example, by flushing the liquid in the cartridge with a gas. For this reason, an air pump may be connected to a brewing head of the device in order to enable the flushing of any residual liquid within a capsule into a receptacle placed beneath the capsule. The purging means also reduce the risk of contamination by a back-flow of the nutritional composition into the device.

WO 2010/128028 relates to a capsule and a device for preparation of a nutritional product, wherein the device is adapted to supply pressurized liquid into the capsule, the capsule comprising at least one compartment containing nutritional ingredients for the preparation of a nutritional composition in combination with the supplied liquid. The device comprises a liquid injector for providing liquid into the capsule and a gas injector for injecting gas into the capsule, wherein the gas injector is spatially distant from the liquid injector. The device further comprises activation means in form of a hinged cam means that are rotated about a horizontal axis and which sequentially apply a downward pressing force onto a hinged injection means and an air inlet spike of capsule opening means. Thereby, the cam means comprise a first portion acting on the hinged injection means and a second portion acting on the air inlet spike.

Such arrangement of the activation means for the movement of the liquid and a gas injection means however has the disadvantage of a relatively cumbersome and not very accurate sequential activation of the liquid and gas injection means. In addition, a rather large space is occupied by the activation means within the brewing head of the device.

Therefore, an enhanced activation means and opening mechanism is sought-after which enable an accurate and simplified movement of the liquid and gas injection means with respect to an upper membrane or injection face of the capsule. Further, it is desired to provide a very space-saving arrangement of the activation means within the device.

The presently disclosed and/or claimed inventive concept(s) seeks to address the above-described problems. The presently disclosed and/or claimed inventive concept(s) also aims at other objects and particularly the solution of other problems as will appear in the rest of the present description.

BRIEF DESCRIPTIONS OF THE DRAWINGS

Further features, advantages and objects of the presently disclosed and/or claimed inventive concept(s) will become apparent for a skilled person when reading the following detailed description of embodiments of the presently disclosed and/or claimed inventive concept(s), when taken in conjunction with the figures of the enclosed drawings.

FIG. 1 schematically depicts a particular (but non-limiting) embodiment of a beverage preparation device comprising a head assembly according to the presently disclosed and/or claimed inventive concept(s).

Figure 2:
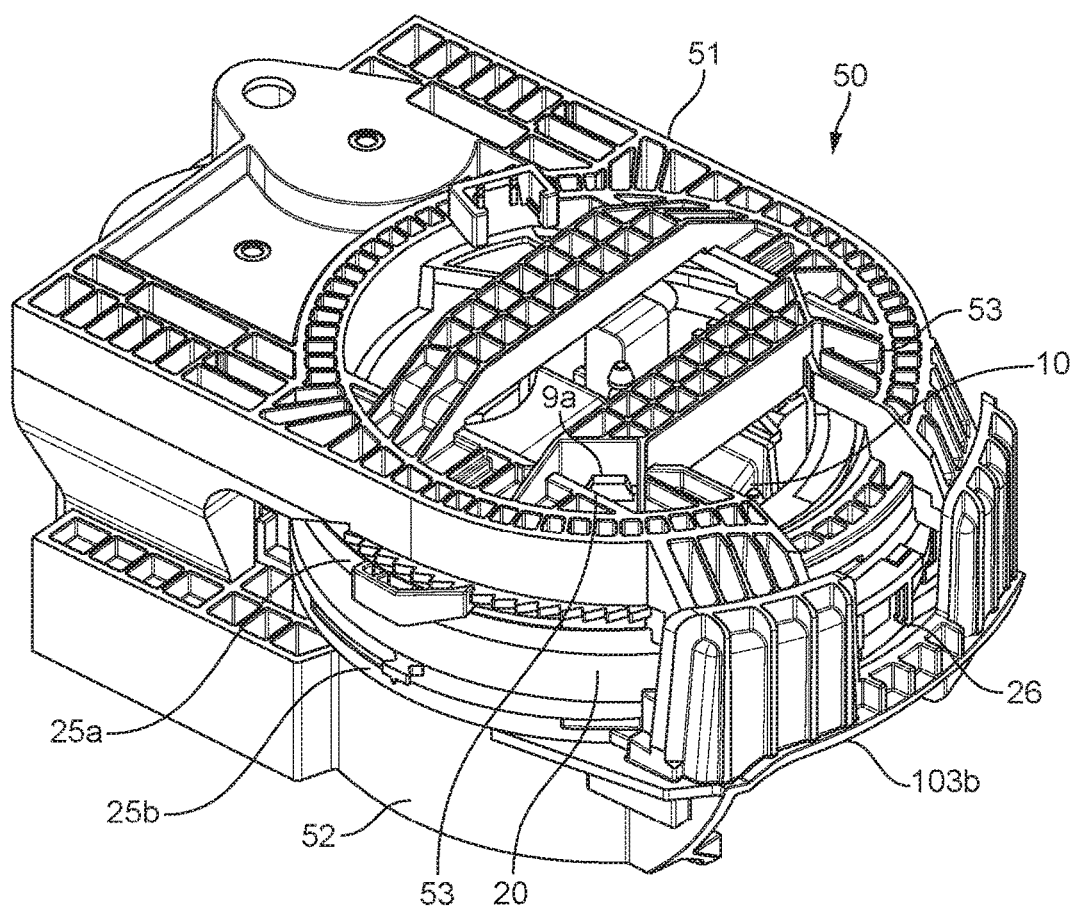

FIG. 2 schematically depicts a particular (but non-limiting) embodiment of an automated fluid injection head assembly according to the presently disclosed and/or claimed inventive concept(s).

Figure 3:
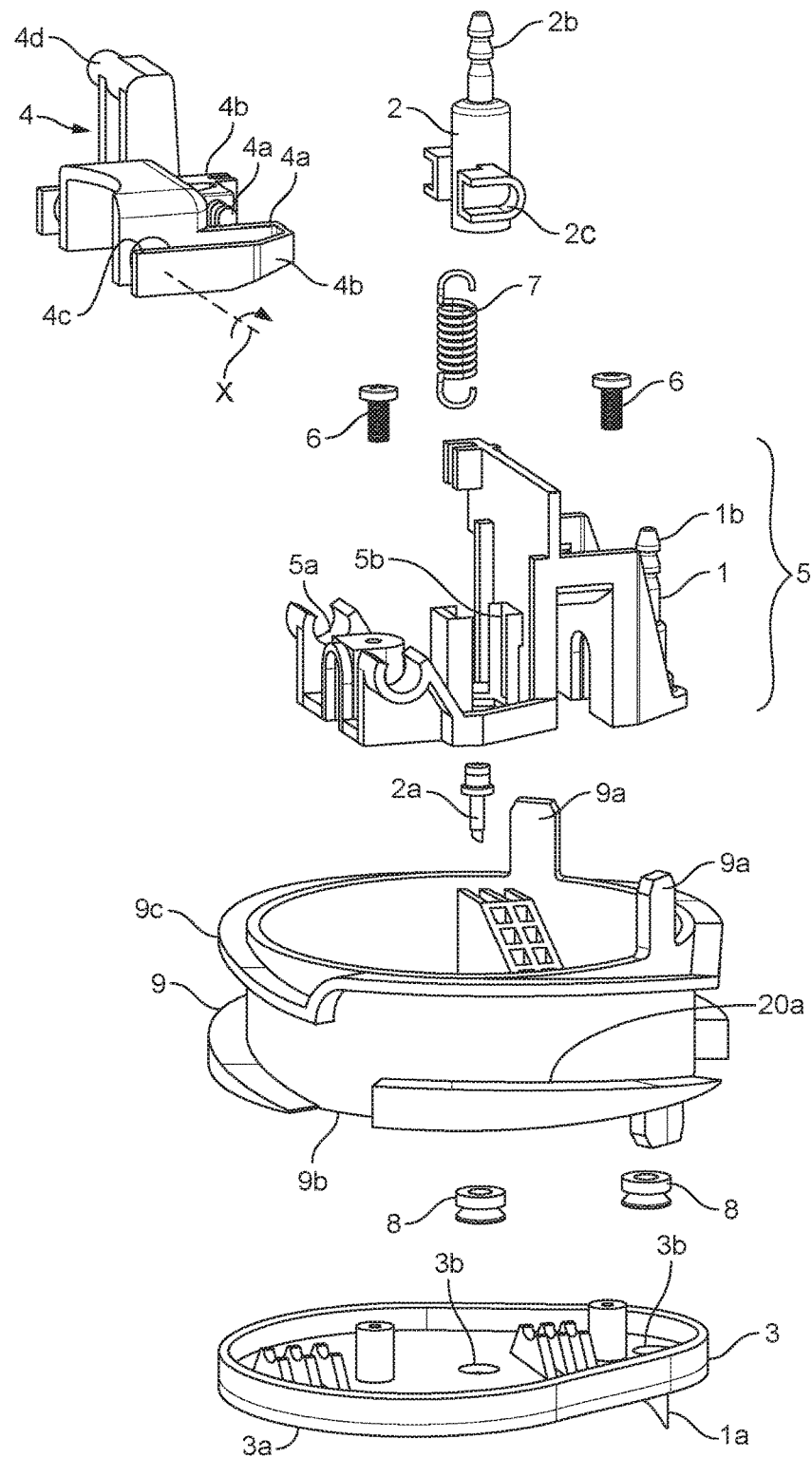

FIG. 3 schematically depicts an exploded assembly drawing of the opening means of the head assembly according to a particular (but non-limiting) embodiment.

Figure 4A:
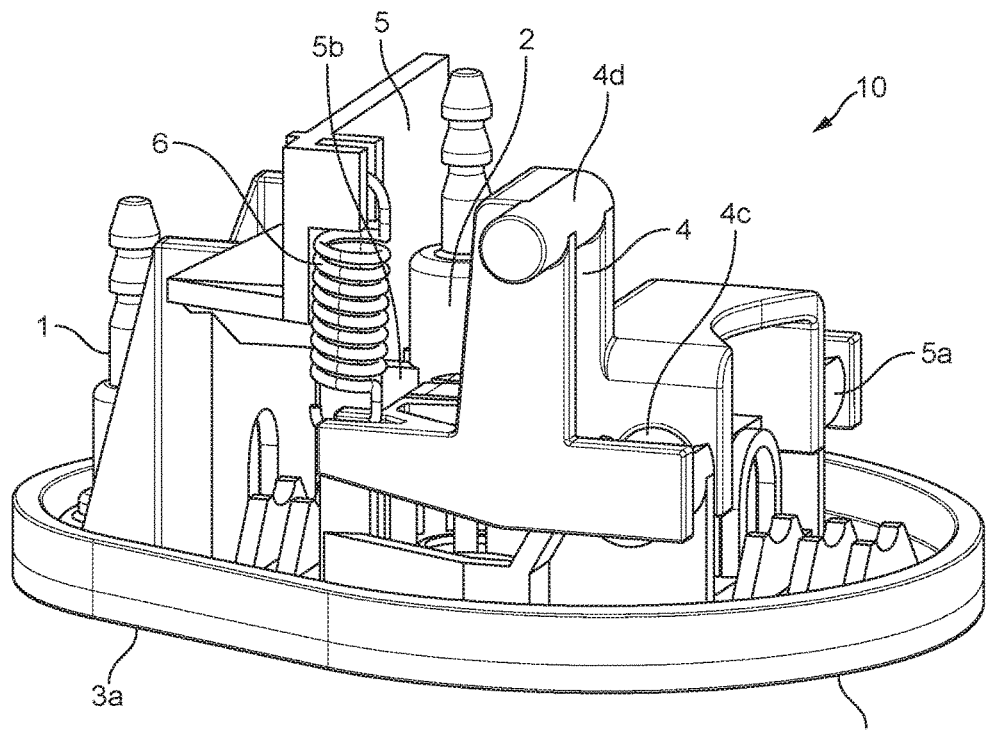
Figure 4B:
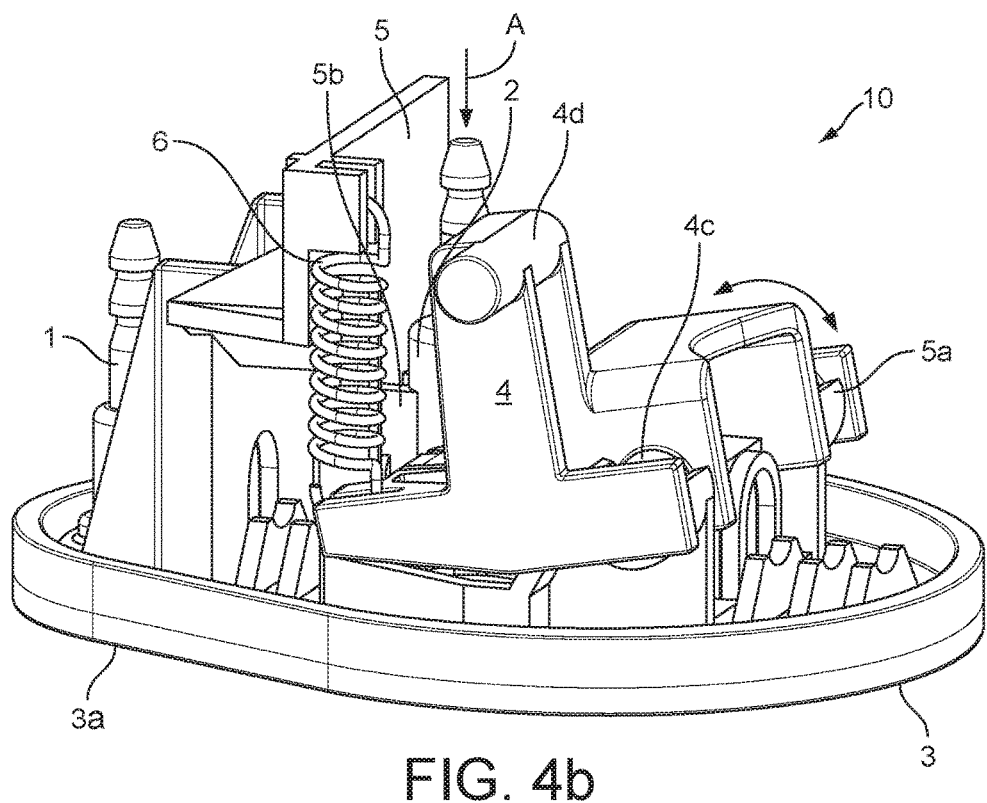

FIGS. 4a and 4b schematically depict the movement of the air injection means from their initial retracted position into their protruding position at a particular (but non-limiting) embodiment of the injection plate.

Figure 5:
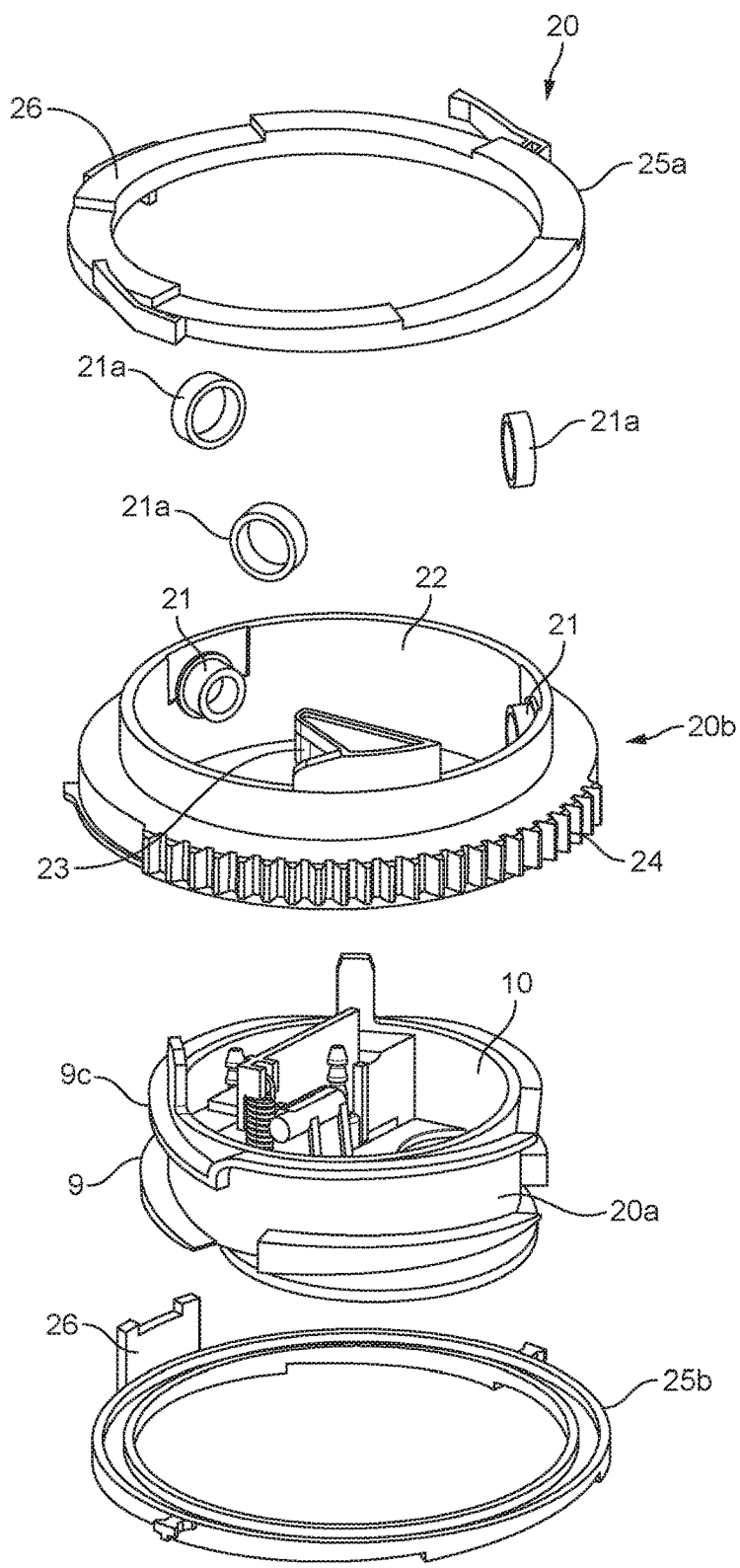
Figure 6:
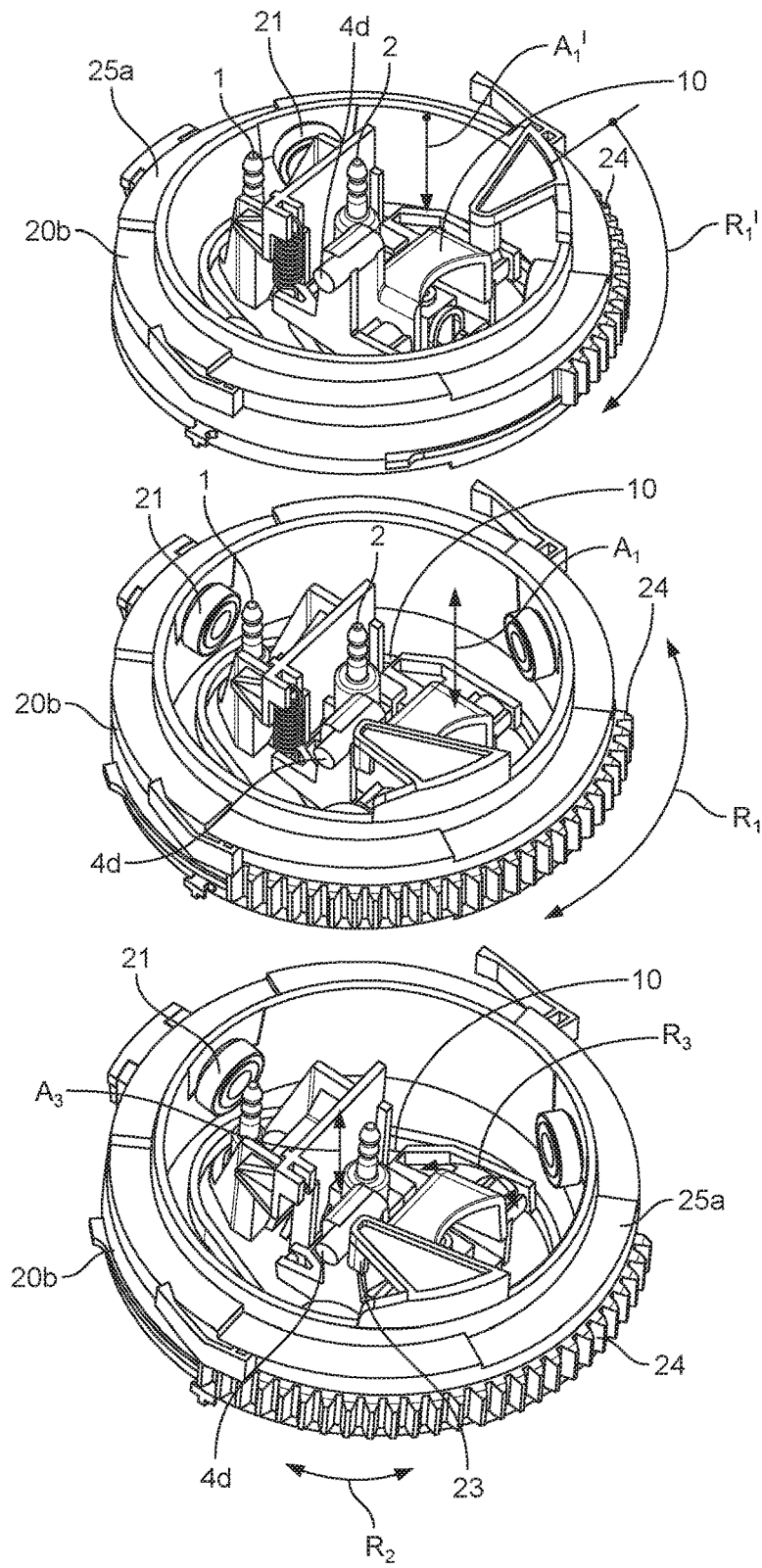

FIG. 5 schematically depicts an exploded assembly drawing of a particular (but non-limiting) embodiment of a main gear of the activation means connected to the opening means;

FIG. 6 schematically depicts the operation of the main gear of the activation means as depicted in FIG. 5 interacting with the opening means.

Figure 7A:
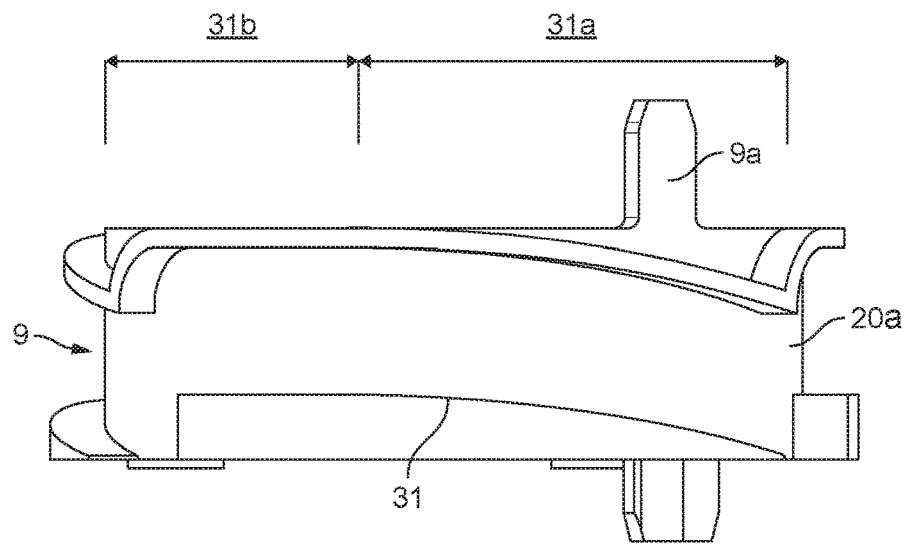
Figure 7B:
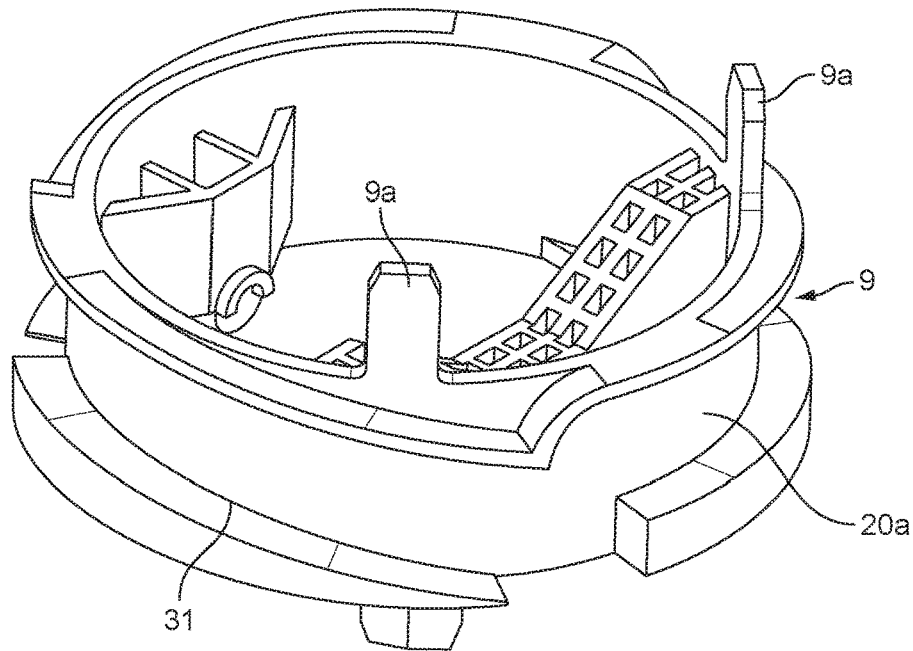

FIGS. 7a and 7b schematically depict a particular (but non-limiting) embodiment of a movable stamp member designed for interacting with the main gear of the activation means by dedicated cam means.

Figure 8:
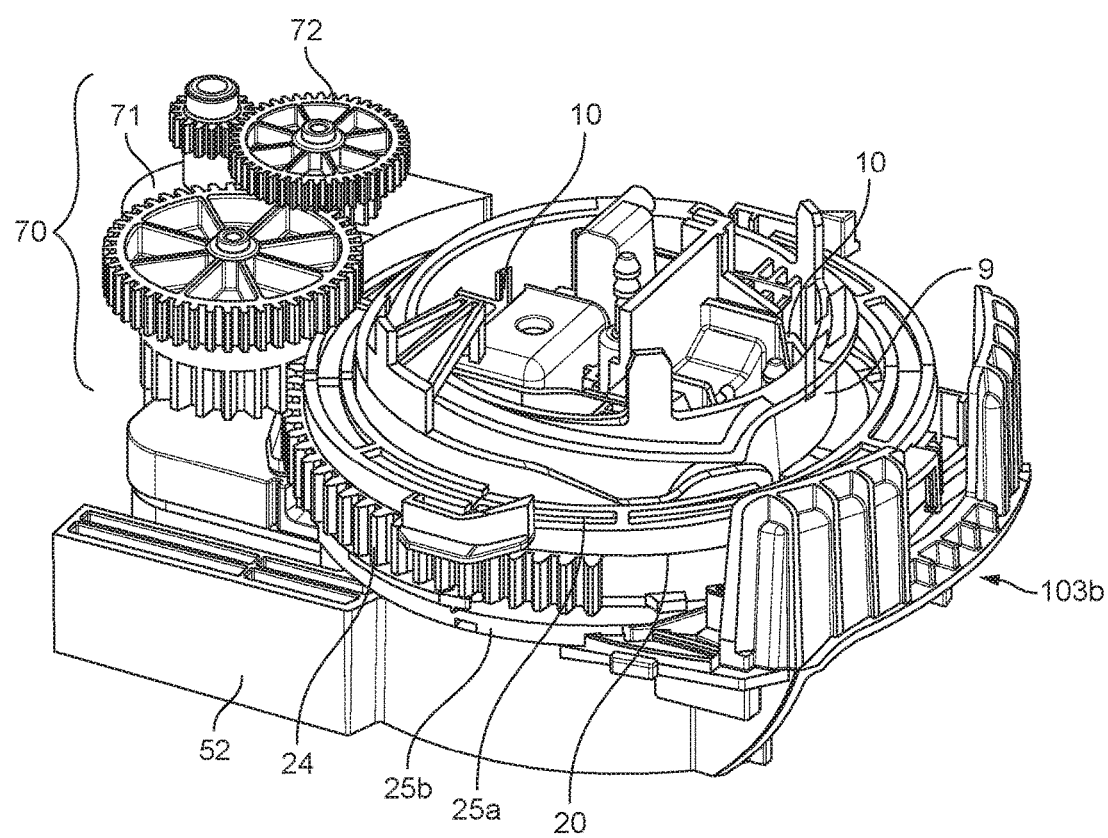

FIG. 8 schematically depicts a perspective view of a particular (but non-limiting) embodiment of the opening means with the activation means and a drive unit in their assembled state.

Figure 9:
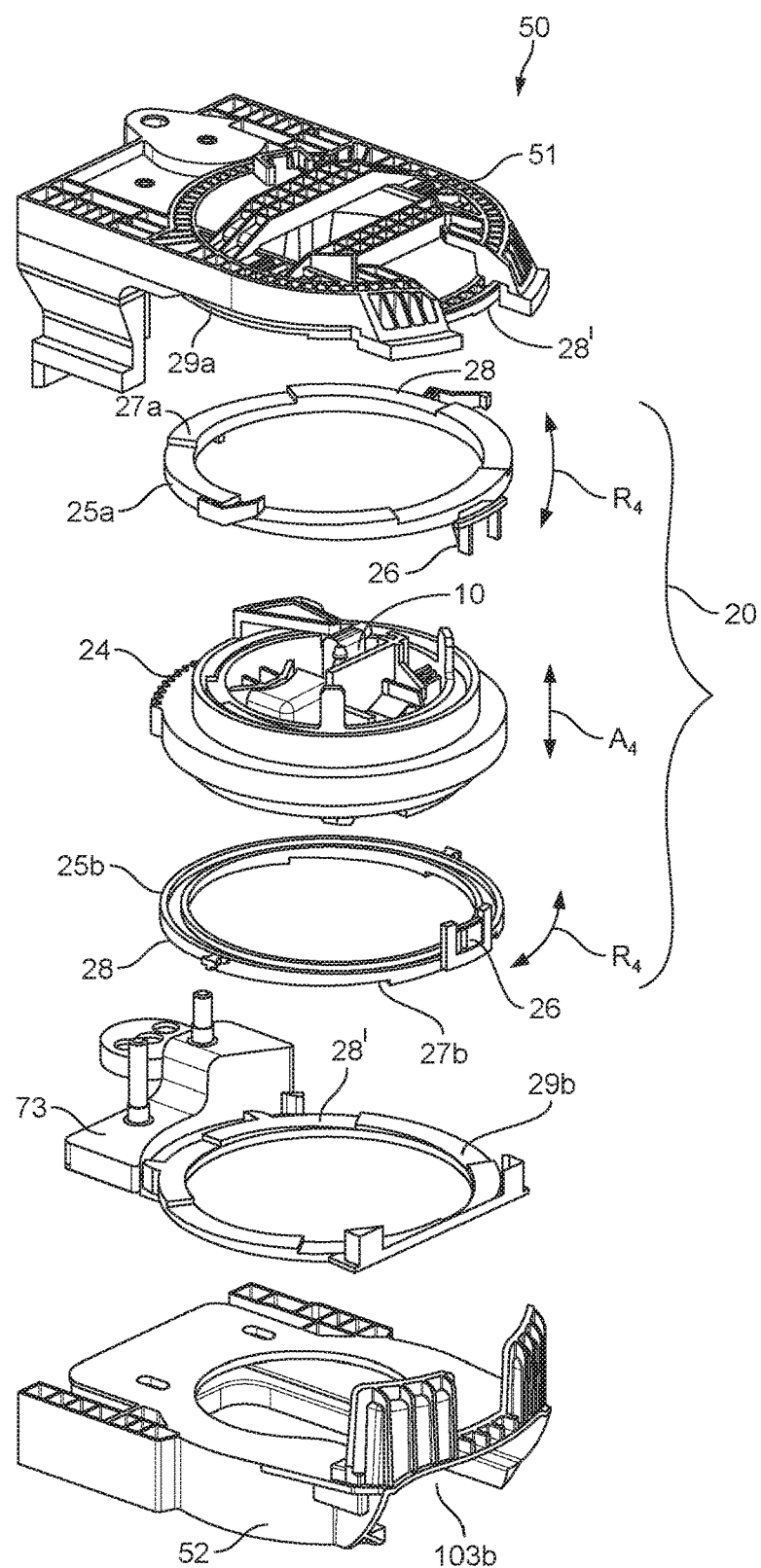

FIG. 9 schematically depicts an exploded assembly drawing of a particular (but non-limiting) embodiment of the automated head of the device with the main gear comprising tolerance compensation means.

Figure 10A:
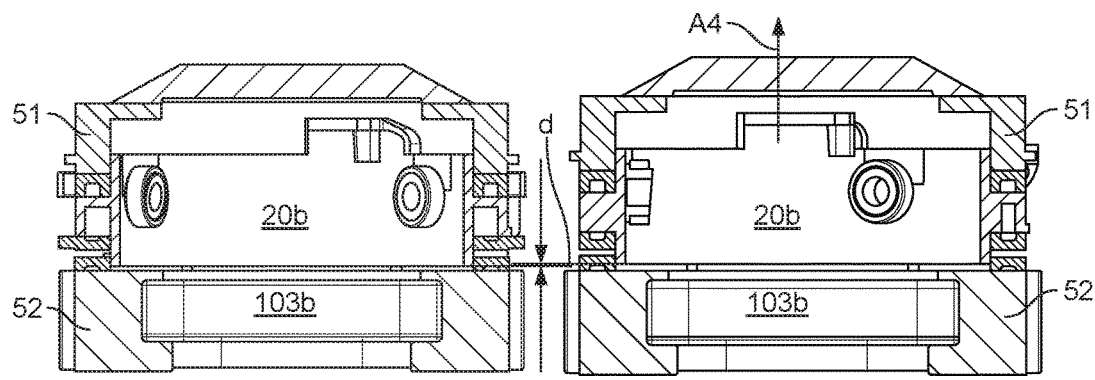
Figure 10B:
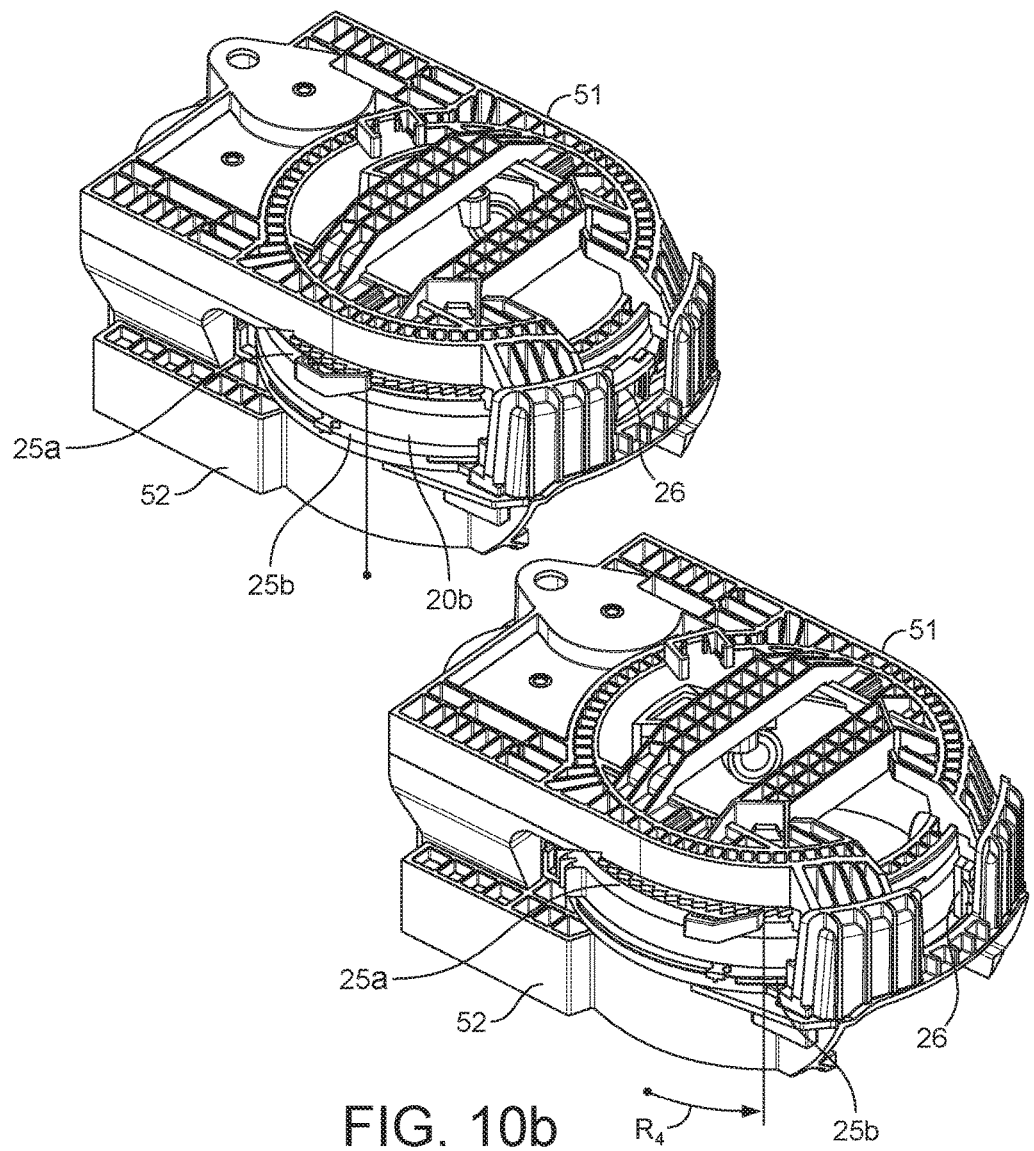

FIGS. 10a and 10b schematically depict the operation of the tolerance compensation means as depicted in FIG. 9.

Figure 11:
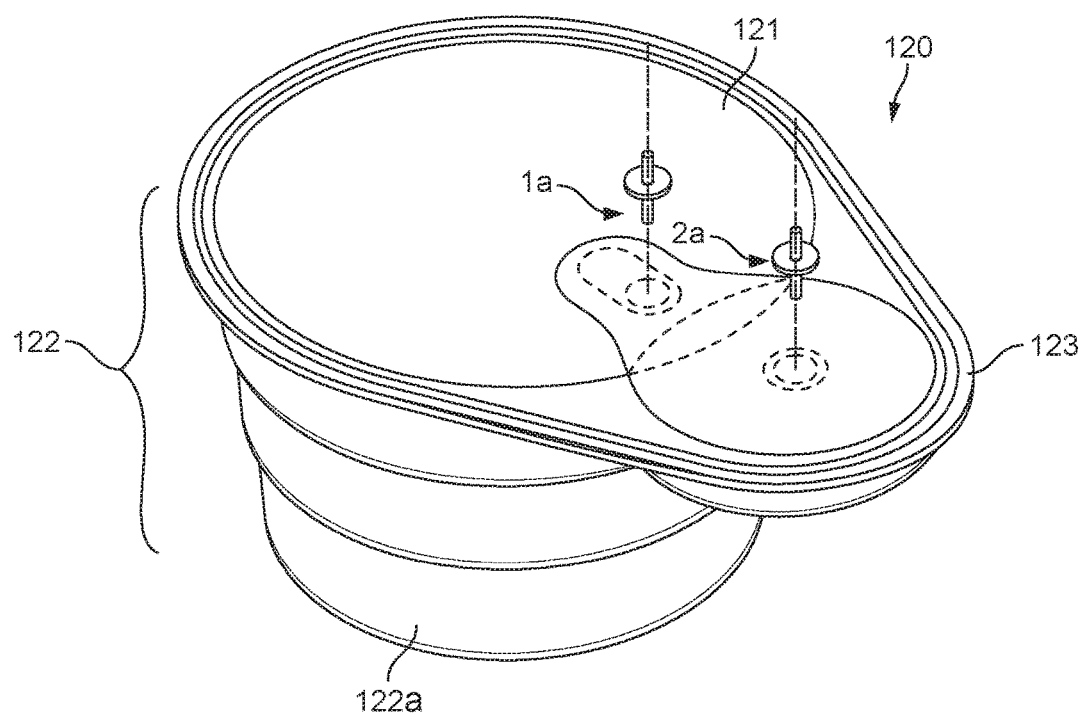

FIG. 11 relates to a capsule suitable for being used in combination with the beverage preparation device according to the presently disclosed and/or claimed inventive concept(s).

DETAILED DESCRIPTION

In a first aspect, the presently disclosed and/or claimed inventive concept(s) relates to a head assembly for a beverage preparation device for preparing a nutritional composition upon interaction of ingredients provided in an exchangeable capsule with liquid supplied to the capsule; the head assembly comprising:
a housing,
capsule opening means which are adapted to interact with an injection face of the capsule, the capsule opening means comprising an injection plate, a liquid injection means for injecting liquid into the capsule and a gas injection means for injecting gas into the capsule,
activation means designed for moving the opening means with respect to the injection face of the capsule,
a drive unit for driving the activation means,
wherein the activation means comprise a driving gear adapted to be driven in a rotational movement by the drive means and,
wherein the head assembly further comprises:
first transmission means, associated with the activation means and capsule opening means, to convert a first portion of said rotational movement of the driving gear into a translational movement of the injection plate for moving the liquid injection means between a distant position and an injection position of the liquid injection means relative to the capsule, and
second transmission means, associated with the activation means and capsule opening means, for moving the gas injection means between a retracted position to a protruding position relative to the injection plate when the driving gear is driven along a second portion of rotational movement by the drive unit.

According to the presently disclosed and/or claimed inventive concept(s), a linear movement of the opening means without radial component such as e.g. in case of hinged opening member, is obtained. Thereby, both parts of the opening means, i.e. the liquid injection means and the gas injection means follow substantially parallel linear trajectories when moved to sequentially contact the injection face of the capsule. The combination of transmission means also enables to provide an activation of the liquid injection and gas injection means which is coordinated and sequenced reliably and simply; thereby requiring a single drive means, e.g., a single motor.

In certain non-limiting embodiments, a single driving gear is used for sequentially actuating the movement of the liquid injection means and the gas injection means. Accordingly, a very space-saving arrangement of the activation means within the head assembly is obtained. In a particular (but non-limiting) embodiment, the rotational movement of the driving gear is a movement about a rotational axis that is preferably (but not by way of limitation) arranged essentially perpendicular to the injection plate or to the injection face of the capsule. In certain non-limiting embodiments, the translatory movement of the opening means is a movement in a direction essentially parallel to a rotational axis about which the driving gear rotates.

In certain non-limiting embodiments, the activation means are designed for moving the liquid injection means and the gas injection means in a linear direction essentially perpendicular to the injection plate of the opening means or injection face of the capsule. Accordingly, a very accurate engagement of the injection means with the capsule injection face is obtained. In a particular (but non-limiting) embodiment, the opening means are lowered from above onto the injection face of the capsule which lies in an essentially horizontal plane within the head assembly.

In certain non-limiting embodiments, the liquid injection means protrude from the lower surface of the injection plate and the gas injection means are linearly movably connected through the injection plate.

In certain non-limiting embodiments, the injection plate is an essentially planar member from which lower surface a piercing element such as a needle member comprised by the liquid injection means protrudes. In certain non-limiting embodiments, the injection plate is designed to cover the whole injection face and, in particular (but non-limiting embodiments, also an outer flange-like rim portion of the capsule when brought into contact therewith. This means that the contours of the injection plate when seen from above are equal to or larger than the injection face of the capsule. In a particular (but non-limiting) embodiment, the contours of the injection plate essentially follow the contours of the injection face and/or an outer rim portion of the capsule when seen from above. Accordingly, an enhanced engagement of the injection face of the capsule by the opening means is obtained. Further, improved sealing of the injection apertures created in the capsule is enabled.

In certain non-limiting embodiments, the liquid injection means are fixedly, i.e. not movably connected to the injection plate. In certain non-limiting embodiments, the gas injection means are movably connected to the injection plate.

In a particular (but non-limiting) embodiment, the gas injection means are designed for being selectively moved from an initial retracted position with regards to the injection plate to a protruding position in which the gas injection means protrude through a hole or recess in the injection plate. In the protruding position a piercing element such as a needle member comprised by the gas injection means protrudes from a lower surface of the injection plate, whereas in the retracted position, the needle member does not protrude from the lower surface thereof. Accordingly, a gas inlet aperture may be created in the injection face of the capsule independently of the movement of the injection plate with respect to the injection face.

For the movement of the gas injection means, in certain non-limiting embodiments, the injection plate comprises a rocker lever arrangement connected to the gas injection means. This rocker lever arrangement is designed for being selectively engaged by a protruding activation pin or lever of the activation means. The rocker lever arrangement may be adapted for converting a rotational movement or a movement containing a radial component into a substantially linear movement of the gas injection means. In a particular (but non-limiting) embodiment, the gas injection means are biased in their retracted position by dedicated biasing means such as a spring member.

In certain non-limiting embodiments, the opening means are connected to a movable stamp arranged at a fluid injection head of the head assembly. In certain non-limiting embodiments, the movable stamp is designed for supporting the opening means within the head assembly. In certain non-limiting embodiments, the movable stamp is connected to the injection plate of the opening means. The movable stamp may as well be integrally formed with the injection plate. In certain non-limiting embodiments, the injection plate is arranged at or connected to a lowermost portion of the movable stamp. In a particular (but non-limiting) embodiment, the movable stamp is arranged at a position above the brewing chamber of the head assembly to which a capsule may be selectively provided, e.g. by means of a movable or detachable capsule holder. In certain non-limiting embodiments, the stamp is adapted for being selectively lowered and lifted with respect to the brewing chamber respectively the injection face of a capsule placed into the brewing chamber.

In certain non-limiting embodiments, the activation means comprise a cylindrical main gear designed for supporting and selectively driving the movable stamp connected to the opening means by first transmission means, such as (but not limited to) forming cam means. Thereby, in certain non-limiting embodiments, the cam means are arranged at an outer annular surface of the movable stamp and designed for engaging with at least one inwardly protruding pin of the cylindrical main gear. The at least one pin of the cylindrical main gear thus constitutes a cam follower interacting with the annular cam of the movable stamp. In a particular (but non-limiting) embodiment, the annular cam means of the movable stamp is a barrel cam. In certain non-limiting embodiments, the cylindrical main gear is arranged at the circumference of the movable stamp. Thereby, the movable stamp is housed inside and supported by the cylindrical main gear.

In certain non-limiting embodiments, the main gear is fixedly arranged within the head assembly. The movable stamp is designed such that it may be moved only linearly in a direction essentially parallel to a rotational axis of the main gear. For this purpose, in certain non-limiting embodiments, the movable stamp comprises rotation prevention means that may interact with dedicated engagement means of e.g. the housing of the head assembly. Accordingly, upon rotational movement of the main gear, the movable stamp will be moved at a linear trajectory parallel to a rotational axis of the main gear. In certain non-limiting embodiments, the main gear is arranged within the head assembly such that the linear movement of the movable stamp is an upwards respectively a downwards movement within the head assembly. Hence, the movable stamp may be lifted and lowered by rotation of the main gear.

In certain non-limiting embodiments, the main gear is arranged within the head assembly at a position above the brewing chamber of the assembly. Accordingly, upon rotation of the main gear, the movable stamp and the opening means connected thereto may be lowered and raised with respect to an upper injection face of the capsule when provided to the brewing chamber of the assembly.

In certain non-limiting embodiments, the annular cam means of the movable stamp comprise a variable pitch. Accordingly, the linear movement of the movable stamp with respect to the main gear may be adapted to meet a desired trajectory. In particular, the linear distance travelled by the movable stamp when the main gear is rotated about a predefined angular path may be adapted.

In a particular (but non-limiting) embodiment, the cam means comprise at least two portions of different pitches. Thereby, in a first portion of the cam means, in certain non-limiting embodiments, the pitch is arranged to convert a rotational movement of the main gear into a translational movement of the movable stamp. Thereby, in this first portion, the pitch of the cam may vary over the length of this portion and/or may be designed such as to increase the axial respectively linear force on the movable stamp upon constant torque at the main gear. At the second portion, the cam may comprise a zero pitch, i.e. such that the rotational movement of the main gear is not converted to a translational movement of the movable stamp. Accordingly, at this second portion, the main gear may further rotate, while the movable stamp will no longer move linearly. The movable stamp will thus stay at a predefined position with respect to a capsule injection face. In the second portion, the gas injection means is thus moved relative to the injection plate whereas the injection plate remains static in translation.

Second transmission means can be supported by the activation means and opening means for moving the gas injection means relative to the injection plate. For this, in certain non-limiting embodiments, the activation means further comprise a protruding activation pin or lever designed for interacting with the rocker lever arrangement of the opening means and which is, in certain particular (but non-limiting) embodiments, designed for selectively driving the gas injection means into their protruding position.

Thereby, the first and second transmission means, in particular the cam means of the movable stamp and the activation pin of the activation means are, in certain particular (but non-limiting) embodiments, designed and positioned with respect to the opening means such that a sequential movement of the liquid injection means and the gas injection means is obtained.

In certain non-limiting embodiments, the activation pin or lever protrudes from an inner annular surface of the main gear such as to engage with the rocker lever arrangement of the opening means at a specific position of the movable stamp with respect to the main gear. In a particular (but non-limiting) embodiment, engagement of the activation pin or lever with the rocker lever arrangement of the opening means takes place upon interaction of the main gear with a second portion of the variable cam means of the movable stamp in which the cam means, in certain particular (but non-limiting) embodiments, comprise a zero pitch. Accordingly, the rotation of the main gear will engage the rocker lever arrangement in order to linearly move the gas injection means while the movable stamp will not experience any further linear movement. Hence, the gas injection means may be moved e.g. to their protruding position while preventing any further movement of the injection plate connected to the movable stamp with respect to the capsule injection face.

The drive means can be a driving unit which is coupled to the main gear and which enables a selective rotation of the main gear in a preferred direction and about a predefined angle. The driving unit may comprise an electric motor arranged to drive a gear wheel engaging with the main gear of the activation means. In certain non-limiting embodiments, the gear wheel engaging with the main gear is arranged to rotate about an axis essentially parallel to the rotational axis of the main gear.

In certain non-limiting embodiments, the activation means further comprises tolerance compensation means designed for adapting the position of the opening means with respect to the injection face of the capsule. In certain non-limiting embodiments, the tolerance compensation means comprise a rotatably movable top and bottom portion arranged to enclose the main gear of the activation means. In certain non-limiting embodiments, the top and bottom portion are designed for being placed between a top and bottom portion of the main gear and an enclosing housing of the fluid injection head of the head assembly. In certain non-limiting embodiments, the top and bottom portion are substantially ring shaped and may comprise connection means for coupling their individual movement with respect to each other. In certain non-limiting embodiments, the top and bottom rings are designed for being rotated about an angle of between +/−30°. In certain non-limiting embodiments, an upper and/or lower annular surface of the respective top and bottom rings have a plurality of sloped or stepped portions which interact with correspondingly shaped contact surfaces of the main gear and/or the enclosing housing of the fluid injection head in order to selectively adapt the distance from a top respectively a bottom portion of the enclosing housing by means of rotation of the top and bottom rings. Hence, due to a rotation of the tolerance compensation means, the position of the main gear in the enclosing housing of the fluid injection head may be adapted in particular with respect to the brewing chamber. Accordingly, the distance of the main gear with respect to the injection face of the capsule when being placed in the brewing chamber may be adapted.

It is to be understood that the liquid injection means and the gas injection means, in certain non-limiting embodiments, each comprise a dedicated needle element for opening respectively piercing the injection face of the capsule. The liquid and gas injection means may further comprise a connecting element for connecting the respective needle element to liquid respectively gas supply means.

The presently disclosed and/or claimed inventive concept(s) also comprises a beverage preparation device comprising a head assembly, as described, a liquid supply means comprising a pump and heating means such as e.g. a thermoblock for provision of a pressurized and/or heated liquid to the capsule. In certain non-limiting embodiments, the liquid supply means further comprise a removable liquid supply tank. The liquid supply means are connected to the liquid injection means.

The beverage preparation device may further comprise an additional gas or air pump for feeding pressurized gas such as air to the gas injection means and thus into the capsule.

In certain non-limiting embodiments, the beverage preparation device is further equipped with control means which enable the selective activation of the driving unit and thus of the liquid and gas injection means. In certain non-limiting embodiments, the control means are further designed to control the liquid supply means and the gas or air pump of the beverage preparation device.

In certain non-limiting embodiments, the capsule to be used in conjunction with the beverage preparation device comprises a nutritional composition such as an infant formula, a nutritional liquid for toddlers, invalids, elderly people, persons having nutritional deficiencies or athletes.

In a particular (but non-limiting) embodiment, the capsule comprises a body portion and a top membrane acting as injection face that is welded to the body portion. In certain non-limiting embodiments, the body portion of the capsule and the top membrane enclose an ingredients compartment. In certain non-limiting embodiments, the capsule is a sealed capsule, i.e. which prevents the ingress of air and/or liquid into the ingredients compartment of the capsule in its closed state. In certain non-limiting embodiments, the body portion of the capsule is made from plastics. In certain non-limiting embodiments, the top membrane is thin enough for being opened respectively pierced by the liquid and gas injection means. In a particular (but non-limiting) embodiment, the top membrane is made from aluminum. The capsule may further comprise an integral filter means for filtering liquid supplied to the capsule. A suitable capsule for being used in conjunction with the described beverage preparation device is described in WO 2010/128028.

In a second aspect, the presently disclosed and/or claimed inventive concept(s) relates to a method for preparing a single serving of a nutritional composition by interaction of nutritional ingredients provided in a capsule with liquid supplied to the capsule using a device as previously described.

In a particular (but non-limiting) embodiment, during the beverage preparation, the injection plate of the opening means designed for engaging with the injection face of the capsule is lowered onto a capsule placed into the beverage brewing chamber of the device. In certain non-limiting embodiments, this is obtained by lowering the movable stamp connected to the opening means in a linear movement due to a rotation of the main gear. The extraction plate from which a needle element of the liquid injection means protrudes downwardly thus perforates respectively pierces the injection face of the capsule. After the movable stamp connected to the injection plate of the opening means has been moved down into engagement with the capsule injection face, the injection of liquid such as water into the capsule the may take place. This is obtained by the control means of the device activating the liquid supply means connected to the needle element of the liquid injection means. The resulting beverage may be drained directly from the capsule into a receiving vessel placed beneath the fluid injection head of the device. Opening of the capsule at its outlet side is obtained, in certain non-limiting embodiments, by self-opening means arranged within the capsule and designed to open the outlet side of the capsule in response to a pressure increase within the capsule.

After liquid provision to the capsule, a gas, such as (but not limited to) air, is injected inside the capsule in order to push residual liquid out. For this purpose, the main gear further continues to rotatably act on the movable stamp, whereby the injection plate no longer moves towards the injection face of the capsule, such as (but not limited to) because of an essentially horizontal portion of the cam of the movable stamp. Then, as the main gear keeps rotating, a dedicated activation lever or pin situated, in certain non-limiting embodiments, on the periphery of the main gear engages a rocker lever connected to the injection plate and the gas injection means and which is designed for moving an air needle element of the gas injection means in a position protruding downwardly from the injection plate. Accordingly, the gas injection needle will open respectively pierce the injection face of the capsule. In this position, control means of the device activate, in certain non-limiting embodiments, a dedicated gas pump for forcing pressurized gas into the capsule. In certain non-limiting embodiments, flushing of the capsule with gas is carried out for a predefined amount of time.

Upon rotation of the main gear in opposite direction, the rocker lever is disengaged by the activation lever or pin of the main gear and thus, the air injection needle will be brought back into its retracted position due to a spring-biasing mechanism connected thereto. Further rotation of the main gear will lead to a linear movement of the movable stamp and thus of the injection plate away from the injection face of the capsule. The capsule used for the beverage preparation process may then be safely removed from the brewing chamber of the device without any interaction with the opening means.

FIG. 1 relates to a particular (but non-limiting) embodiment of a beverage preparation device 100 according to the presently disclosed and/or claimed inventive concept(s). The device 100 comprises a casing 101 with a fluid injection head 102 at an upper portion thereof. The fluid injection head houses an automated head assembly 50 (see also FIG. 2). The fluid injection head 102 comprises an aperture 103b to which a dedicated capsule holder 103 may be selectively connected. The capsule holder 103 may be a separate part connectable to the aperture 103b or constitute a drawer-like arrangement fixedly connected to the casing 101 which may be inserted to and drawn from the aperture 103b. The capsule holder comprises a central recess 103a for housing a capsule 120 (see FIG. 11) suitable for being used for beverage preparation with the device 100. In certain non-limiting embodiments, the recess 103a constitutes the receiving chamber for the capsule when the capsule holder 103 is connected to the device 100.

An example of a suitable capsule 120 for being placed into capsule holder 103 is shown in FIG. 11. In certain non-limiting embodiments, the capsule holder 103 is designed such that an injection face, for example, formed of an upper membrane or lid 121 of the capsule, is arranged essentially horizontally within the device 100 when placed into the recess 103a.

Below the fluid injection head 102, a stand 104 is arranged for supporting a receiving receptacle (not shown) in which the resulting beverage may be collected. During beverage preparation, in certain non-limiting embodiments, the beverage is directly poured from a lower outlet face of the capsule 120. The vertical distance of stand 104 from the fluid injection head 102 or inserted capsule may be varied by means of dedicated adjustment means 104a, 104b, such as a series of mechanical and/or magnetic protrusions, evenly distributed vertically on the front wall of the housing below the injection head.

In certain non-limiting embodiments, the device 100 comprises a fluid supply circuit (not shown) for providing liquid to the capsule. In certain non-limiting embodiments, the fluid supply circuit comprises a liquid supply reservoir 105, a liquid pump and liquid heating means (non-illustrated). The fluid supply circuit is connected to liquid injection means 1 which will be later described in detail. Accordingly, a cold or hot pressurized liquid, typically water, may be provided to the capsule 120.

In certain non-limiting embodiments, the device 100 further comprises purging means (not shown) for providing pressurized gas such as compressed air into the capsule 120. In certain non-limiting embodiments, the purging means comprise a dedicated gas or air pump connected to gas injection means 2 which will be later described in detail.

In certain non-limiting embodiments, a control unit of the device is designed to control the operation of the device 100. In particular, the control unit is designed for controlling the liquid and gas supply to the capsule 120 as well as the movement of the individual parts of the automated fluid injection head 50 as will be described in the following.

FIG. 2 relates to a particular (but non-limiting) embodiment of the automated fluid injection head 50 of the device 100 (also referred in the description as "head assembly") according to the presently disclosed and/or claimed inventive concept(s). In certain non-limiting embodiments, the fluid injection head 50 comprises upper and lower housing parts 51, 52 which enclose opening means 10 and activation means 20 of the device 100.

FIG. 3 relates to an exploded assembly drawing of the opening means 10 of the device 100 according to a particular (but non-limiting) embodiment. The opening means 10 comprise an injection plate 3 for selectively contacting an injection face 121 of the capsule 120 from above when inserted into the brewing chamber 103a.

The opening means further comprise a liquid injection means 1 and gas injection means 2. Both the liquid injection means and the gas injection means comprise a piercing element 1a, 2a such as a needle member, and a connecting element 1b,2b, such as glands, for connecting the piercing element 1a, 2a to dedicated liquid and gas supply means such as a supply tubing (not shown). Both the liquid and gas injection means 1, 2 may comprise dedicated sealing members 8 such as an O-ring placed about the circumference of the piercing elements 1a, 2a. Guiding holes 3b are, in certain non-limiting embodiments, arranged at the injection plate 3 in order to enable a protrusion of the individual piercing elements 1a, 2a from the injection plate 3. The piercing element 1a of the liquid injection means 1 is fixedly arranged at a lower surface 3a of the injection plate 3 from which it protrudes, while the piercing element 2a of the gas injection means 2 is designed for selectively moving from a retracted position through an aperture or hole 3b provided in the injection plate 3 to an extended (working) position in which the piercing element protrudes beyond the lower surface 3a of the injection plate 3.

The injection plate 3 is connected to a support structure 5 designed for supporting the liquid injection means 1 and the gas injection means 2. In certain non-limiting embodiments, the support structure 5 is connected to the injection plate 3 from above by means of screws 6. The support structure 5 comprises a guiding shaft 5b arranged essentially perpendicular to the lower surface 3a of the injection plate 3, in which guiding shaft 5b the gas injection means 2 are movably supported. The guiding shaft 5b restricts the movement of the gas injection means 2 to a linear upwards and downwards movement.

The support structure 5 further comprises bearing flanges 5a for movably supporting a rocker lever arrangement 4 (also simply called "rocker lever" hereafter) of the opening means 10. In certain non-limiting embodiments, the bearing flanges 5a are designed to enable a rotation of the rocker lever 4 about an axis X arranged essentially in parallel to the lower surface 3a of the injection plate 3 (FIG. 3). The bearing flanges 5a thereby engage with two bolts 4c arranged at the lateral sides of the rocker lever 4.

The rocker lever arrangement 4 further comprises connection bolts 4a that protrude inwardly from lateral levers 4b. The connection bolts 4a are engaged with lateral cam means 2c arranged at the gas injection means 2. The rocker lever arrangement further comprises an activation lever 4d protruding in an essential perpendicular direction to the lateral levers and designed for enabling a rotation of the rocker lever arrangement about a rotational axis of bolts 4c respectively of bearing flange 5a. Upon movement of the rocker lever arrangement 4 about axis X, the gas injection means 2 is driven downwardly respectively upwardly with respect to the support structure 5 and the injection plate 3. Thereby, the gas injection means 2 may assume a retracted (rest) position in which the piercing element 2a does not protrude from the lower surface 3a of the injection plate 3 and a protruding (working) position in which the piercing element 2a protrudes therefrom. In certain non-limiting embodiments, a dedicated spring member 7 biases the gas injection means 2a into their retracted position. Accordingly, if no force is applied on lever 4d of the rocker lever arrangement 4, the gas injection means 2 will stay in the retracted (rest) position.

In certain non-limiting embodiments, the opening means 10 are fixedly connected to a movable stamp 9 designed to be moved by activation means 20 of the device 100. In certain non-limiting embodiments, the stamp 9 is connected to the opening means 10 as a separate part. In an alternative embodiment, the stamp 9 may be an integral part of the opening means 10. The stamp 9 may comprise an essentially cylindrical main body. In certain non-limiting embodiments, the injection plate 3 is arranged at a lowermost respectively bottom surface 9b of the stamp 9. At the outer annular surface of the movable stamp 9, cam means 20a are arranged which are designed for being engaged by activation means 20 of the device 100. At an upper portion of the stamp 9, two preferably (but not by way of limitation) vertically protruding latches or bolts 9a may be arranged which are designed for being translationally guided by dedicated support means 53 of the housing part 51 of the automated fluid injection head 50 (see also FIG. 2). By means of these latches or bolts 9a guided within dedicated support means 53, the movable stamp 9 is prevented from rotating within the fluid injection head 50. The stamp 9 and thus the opening means 10 connected thereto are thus prevented from undesired rotation within the fluid injection head 50.

FIGS. 4a and 4b relate to the assembled state of the opening means 10 and indicate the movement of the air injection means 2 from the initial retracted position as shown in FIG. 4a into the protruding position as shown in FIG. 4b. As shown in FIG. 4a, the spring 6 exerts a biasing force (more particularly, a traction force) onto the rocker lever arrangement 4 designed to rotate about rotational axis X (see FIG. 3) such that the gas injection means 2 is kept in its retracted upper position. In case the rocker lever arrangement 4 is rotated against the biasing force exerted by the spring 6, the gas injection means 2 are moved downwards as indicated by arrow A and thus into their protruding position, in which the piercing element 2a of the gas injection means 2 will protrude from the lower surface 3a of the injection plate 3. Hence, upon activation of the rocker lever arrangement 4, the piercing element 2a is lowered in order to pierce the injection face 121 of the capsule 120 when engaged by the lower surface 3a of the injection plate 3. In such position, air can be supplied to the injection means for flushing liquid and nutritional substance contained in the capsule.

FIG. 5 relates to an exploded assembly drawing of a particular (but non-limiting) embodiment of a main gear 20b (also called "driving gear" in the description) of the activation means 20 connected to the opening means 10. In certain non-limiting embodiments, the main gear 20b is an essentially cylindrical part designed for supporting and selectively driving in movement the movable stamp 9 and the opening means 10 connected thereto. For this purpose, the main gear 20b comprises at least one, such as (but not limited to) two or three inwardly protruding pins or cam followers 21 which may be equipped with rolls 21a and which engage with the annular cam 20a of the movable stamp 9. The main gear 20b is thus arranged at the circumference of the movable stamp 9. A continuous inner annular surface 22 supports an outer annular surface or surfaces 9c of the movable stamp 9. The stamp 9 is thus supported in movable way within a central cylindrical bore 22 of the main gear 20b.

The main gear 20b further comprises an inwardly protruding activation lever or pin 23 that is designed for engaging with the rocker lever arrangement 4 of the opening means 10 upon rotation of the main gear 20b. At the outer circumference, the main gear 20b, in certain non-limiting embodiments, comprises a gear wheel portion 24 designed for interacting with a drive unit 70 of the device, more particularly (but not by way of limitation), a gear transmission connected to a single electrical motor (see e.g. FIG. 8).

The activation means 20 may further comprise tolerance compensation means 25a, 25b positioned respectively at the upper and lower sides of the main gear 20b and between the main gear and the housing parts 50, 51. In certain non-limiting embodiments, the tolerance compensation means comprise two ring elements which may be connected by dedicated connection means 26 for enabling a coupled movement of the compensation means 25a, 25b. A more detailed explanation of the tolerance compensation means 25a, 25b is given below with respect to FIGS. 9, 10a and 10b.

FIG. 6 relates to the assembled state of the main gear 20b of the activation means 20 and the opening means 10 and shows the sequential operation of the main gear interacting with the opening means 10. Notably, for clarity reasons within this figure, the movable stamp 9 is omitted from this figure. In certain non-limiting embodiments, the main gear 20b is arranged at a fixed axial position within the automated fluid injection head 50 (see e.g. FIG. 2).

By means of a rotation of the main gear 20b about its rotational axis in direction R1', driven by the drive means 70, the movable stamp 9 is lowered in linear or translational trajectory (see arrow A1') within the main gear 20b, due to the annular cam means 20a of stamp 9 (see FIG. 5) interacting with the cam followers 21 of the main gear 20b. Accordingly, the stamp 9 and the opening means 10 connected thereto may be lowered onto an injection face 121 of the capsule 120 situated in a brewing chamber arranged below the main gear 20b and the stamp 9. The needle element 1a of the liquid injection means protruding from the injection plate 3 will thus pierce the injection face 121, e.g. membrane, of the capsule.

As more generally indicated in the second drawing in FIG. 6, the cam means 20a of the stamp 9 are, in certain non-limiting embodiments, designed to convert a rotational movement of the main gear 20b within a given angular path R1 into a linear movement A1 of the opening means 10 which is in a direction essentially parallel to a rotational axis of the main gear 20b. The rotational movement within angular path R1 thus leads to a lowering or lifting of the opening means 10 depending on the sense of rotation of the main gear 20b. This conversion is obtained, in certain non-limiting embodiments, by an essentially sloped portion 31a of the cam 20a of the movable stamp 9 (see FIG. 7a).

As indicated in the third drawing in FIG. 6, beyond the angular path R1, a further rotation R2 of the main gear 20b is no longer converted into a further linear movement of the opening means 10. Instead, the opening means 10 is maintained at their lowered (engaging) position with respect to a capsule injection face 121. This position holding is obtained, in certain non-limiting embodiments, by an essentially horizontal portion 31b of the cam 20a of the movable stamp 9 (see FIG. 7a). By "horizontal", it is here meant an orientation of the cam path which is along the plane of the rotational movement of the mean gear. However, upon this further rotation in the first sense of direction R2, the activation lever or pin 23 arranged at the periphery of the main gear 20b engages the activation lever 4d of the rocker lever arrangement 4 connected to the injection plate and the gas injection means 2 and which thus rotates (see arrow R3) about its rotational axis X as previously described with respect to FIG. 3. The actuation of the rocker lever arrangement 4 leads to a descent of the gas injection means 2 which are thus brought into their protruding position. Hence, the piercing or needle element 2a of the gas injection means 2 may pierce the injection face 121 of the capsule 120 arranged below the injection plate 3. Upon rotation of the main gear 20b in the opposite sense of direction R2, the rocker lever arrangement 4 is disengaged by the activation lever or pin 23 of the main gear 20b and thus, the air injection needle 2a will be brought back into its retracted position due to a spring-biasing mechanism 7 connected thereto.

FIGS. 7a and 7b relates to a particular (but non-limiting) embodiment of the movable stamp 9 designed for interacting with the main gear 20b of the activation means 20 by the cam means 20a. As indicated in FIG. 7a, in certain non-limiting embodiments, the cam means 20a of the movable stamp 9 comprises a variable pitch 31.

In certain non-limiting embodiments, the variable pitch 31 comprises two portions 31a, 31b of different pitches. Thereby, in a first portion 31a of the cam means 20a, the pitch is arranged, in certain non-limiting embodiments, to convert a rotational movement of the main gear 20b into a translational respectively linear movement of the movable stamp 9. Thereby, in this first portion 31a, the pitch of the cam may vary over the length of this portion and/or may be designed such as to partially increase the axial respectively linear force on the movable stamp 9. In particular, by means of a decreasing pitch 31, the axial force applied to the stamp 9 rises by constant torque at the main gear.

In the second portion 31b of the variable pitch 31, in certain non-limiting embodiments, the cam 20a may comprise a zero pitch, i.e. such that the rotational movement of the main gear 20b is not further converted to a translational movement of the movable stamp 9. Accordingly, at this second portion 31b, the main gear 20b may further rotate, while the movable stamp 9 will no longer move linearly.

FIG. 8 relates to a perspective side view of a particular (but non-limiting) embodiment of the opening means 10 with the activation means 20 and a drive unit 70 of the device 100 in their assembled state. As shown in the figure, the housing parts 51, 52 of the automated fluid injection head 50 support the drive unit 70. A dedicated drive support unit 73 may also be connected to the housing parts 51, 52 (see FIG. 9). In certain non-limiting embodiments, the drive unit 70 comprises an electric motor 71 coupled via a plurality of wheels 72 with the gear wheel portion 24 of the main gear 20b. Accordingly, the drive unit 70 may selectively rotate the main gear 20b in a desired rotational direction and about a predefined angular path. In certain non-limiting embodiments, the wheels 71 of the drive unit 70 rotate about rotational axes that are arranged in parallel to the rotational axis of the main gear 20b.

FIG. 9 relates to an exploded assembly drawing of a particular (but non-limiting) embodiment of the automated fluid injection head 50 of the device with the main gear 20b of the activation means 20 comprising tolerance compensation means 25a, 25b designed for adapting the position of the opening means 10 with respect to the injection face 121 of the capsule 120.

In certain non-limiting embodiments, the tolerance compensation means comprise a rotatably movable top and bottom ring element 25a, 25b, which are arranged to enclose the main gear 20b when assembled in the fluid injection head 50. Thereby, the respective top and bottom ring elements 25a, 25b are placed between a respective top and bottom portion of the main gear 20b and a top and bottom part 51, 52 of the housing of the fluid injection head 50. Accordingly, the main gear 20b is sandwiched between the top and bottom ring elements 25a, 25b and within the top and bottom housing part 51, 52. Between the bottom part 52 and the bottom ring 25b, a support unit 73 of the drive unit 70 of the device 100 may be arranged.

The top and bottom ring elements 25a, 25b are designed such that upon rotation R4 of these elements, the main gear 20b is lifted and lowered in its vertical position (see arrow A4) between the top and bottom housing part 51, 52 of the fluid injection head 50. In certain non-limiting embodiments, the top and bottom rings are designed for being rotated about an angle of between +/−45°, such as (but not limited to) between −30°. Thereby, rotation of the top and bottom ring elements 25a, 25b results in a lifting and lowering distance d of the main gear 20b between 1.0 to 3.0 mm, such as (but not limited to) between 1.5 and 2.0 mm.

An upper and/or lower annular surface 27a, 27b of the top and bottom rings 25a, 25b comprise a plurality of sloped or stepped portions 28 that, in certain non-limiting embodiments, are homogenously distributed about the circumference of the respective rings 25a,25b. These sloped or stepped portions 28 of essentially helicoidal design are designed for interacting with correspondingly shaped portions 28' arranged at the circumference of the respective contact surfaces of the enclosing housing parts 51, 52 or of the housing part 51 and a ring shaped element of the drive support unit 73.

In certain non-limiting embodiments, the top and bottom ring elements 25a, 25b are connected to each other in order to move in a synchronous manner and thus prevent clamping of the main gear 20b between the tolerance compensation means. In certain non-limiting embodiments, such connection between the rings 25a, 25b is obtained by means of a latch or snap connection 26 that may be arranged at the circumference of the ring elements 25a, 25b.

FIGS. 10a and 10b illustrate the operation of the tolerance compensation means 25a, 25b as depicted in FIG. 9. Thereby, as previously described with reference to FIG. 9, by rotation of the compensation means 25a, 25b in synchronised manner in direction R4, the main gear 20b of the activation means 20 is lifted respectively lowered by variable distance d within the fluid injection head 50. Accordingly, a distance of the main gear 20b and thus of the opening means 10 with respect to the injection face 121 of the capsule 120 when placed in the beverage brewing chamber may be adjusted.

FIG. 11 relates to a particular (but non-limiting) embodiment of a capsule 120 suitable for being used in combination with the beverage preparation device 100. The capsule 120 comprises a body portion 122 for receiving nutritional ingredients. The capsule comprises a cup 122a formed in the body 122 which is closed by a liquid impermeable top membrane or foil 121 sealed onto the flange-like rim 5 of the body 122. The top membrane or foil 121 constitutes the injection face of the capsule. The top membrane 121 may be liquid impervious or, in certain non-limiting embodiments, liquid and gas impervious. The membrane 121 is thus made of a puncturable material such as thin polymer and/or aluminum to enable liquid to be supplied to the capsule by means of a piercing element 1a of the liquid injection means 1 and gas supplied to the capsule by means of a piercing element 2a of the gas injection means 2.

The invention claimed is:

1. A head assembly for a beverage preparation device for preparing a nutritional composition upon interaction of ingredients provided in an exchangeable capsule with liquid supplied to the capsule, the head assembly comprising:
    a housing;
    capsule opening means which are adapted to interact with an injection face of the capsule, the capsule opening means comprising an injection plate, a liquid injection means for injecting liquid into the capsule, and a gas injection means for injecting gas into the capsule;
    activation means designed for moving the opening means with respect to the injection face of the capsule;
    a drive unit for driving the activation means;
    wherein the activation means comprise a driving gear adapted to be driven in rotational movement by the drive unit; and
    wherein the head assembly further comprises:
        first transmission means associated with the activation means and capsule opening means to convert a first portion of rotational movement of the driving gear into a translational movement of the injection plate for moving the liquid injection means between a distant position and an injection position of the liquid injection means relative to the housing or capsule; and
        second transmission means associated with the activation means and capsule opening means for moving the gas injection means between a retracted position to a protruding position relative to the injection plate when the driving gear is driven along a second portion of rotational movement by the drive unit.

2. The head assembly according to claim 1, wherein the activation means are designed for moving the liquid injection means and the gas injection means in a linear direction essentially perpendicular to the injection plate or injection face of the capsule.

3. The head assembly according to claim 1, wherein the rotational movement of the driving gear is a movement about a rotational axis which is arranged essentially perpendicular to the injection plate of the opening means or injection face of the capsule.

4. The head assembly according to claim 1, wherein the liquid injection means protrude from the lower surface of the injection plate, and the gas injection means are linearly movably connected through the injection plate.

5. The head assembly according to claim 4, wherein the gas injection means are designed for being selectively moved from an initial retracted position with regards to the injection plate to a protruding position in which the gas injection means at least partially protrude beyond a hole or recess in the injection plate.

6. The head assembly according to claim 1, wherein the activation means comprise a cylindrical main gear designed for supporting and selectively driving a movable stamp connected to the opening means by cam means.

7. The head assembly according to claim 6, wherein the cam means are arranged at an outer annular surface of the movable stamp and which are designed for engaging with at least one inwardly protruding pin of the cylindrical driving gear.

8. The head assembly according to claim 6, wherein the cam means forms a barrel cam.

9. The head assembly according to claim 6, wherein the cam means comprise a variable pitch.

10. The head assembly according to claim 6, wherein the activation means further comprise a protruding activation pin or lever designed for interacting with a rocker lever arrangement of the opening means and designed for selectively driving the gas injection means into a protruding position.

11. The head assembly according to claim 10, wherein the cam means and the activation pin or lever are designed and positioned with respect to the opening means such that a sequential movement of the liquid injection means and the gas injection means is obtained upon rotation of the main gear.

12. The head assembly according to claim 1, wherein the activation means further comprise tolerance compensation means for adapting the position of the opening means with respect to the injection face of the capsule.

13. The head assembly according to claim 12, wherein the tolerance compensation means comprise a rotatably movable top and bottom ring arranged to enclose a main gear of the activation means and which are coupled in their movement by connection means.

14. The head assembly according to claim 1, wherein the liquid injection means and the gas injection means each comprise a dedicated needle element for opening respectively piercing the injection face of the capsule.

15. A beverage preparation device comprising:
    a head assembly according to claim 1.

* * * * *

UNITED STATES PATENT AND TRADEMARK OFFICE
CERTIFICATE OF CORRECTION

PATENT NO.         : 10,159,376 B2
APPLICATION NO.    : 15/547640
DATED              : December 25, 2018
INVENTOR(S)        : Ludovic Dovat and Christof Niedermann Page 1 of 1

It is certified that error appears in the above-identified patent and that said Letters Patent is hereby corrected as shown below:

On the Title Page

Under (54) Title: After "HEAD" delete "OF" and replace with -- FOR --

Under (57) Abstract: Delete the Abstract in its entirety and replace with
-- A head assembly for a beverage preparation device for preparing a nutritional composition is disclosed, along with a beverage preparation device including same, and methods of production and use thereof. --

In the Specification

Column 1, Line 1: After "HEAD" delete "OF" and replace with -- FOR --

Signed and Sealed this
Nineteenth Day of February, 2019

Andrei Iancu
*Director of the United States Patent and Trademark Office*